US007583258B2

(12) United States Patent
Kong

(10) Patent No.: US 7,583,258 B2
(45) Date of Patent: *Sep. 1, 2009

(54) OPTICAL TRACKER WITH TILT ANGLE DETECTION

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

This patent is subject to a terminal disclaimer.

(21) Appl. No.: 11/269,287

(22) Filed: Nov. 8, 2005

(65) Prior Publication Data

US 2007/0103436 A1    May 10, 2007

(51) Int. Cl.
    *G09G 5/00* (2006.01)
(52) U.S. Cl. .................. 345/204; 345/156; 345/158
(58) Field of Classification Search .......... 345/240, 345/158, 175, 204
    See application file for complete search history.

(56) References Cited

U.S. PATENT DOCUMENTS

| 5,730,602 A * | 3/1998 | Gierhart et al. | 434/155 |
| 2002/0064382 A1 * | 5/2002 | Hildreth et al. | 396/100 |
| 2004/0178995 A1 * | 9/2004 | Sterling | 345/173 |
| 2005/0111735 A1 * | 5/2005 | Sheinin | 382/187 |

\* cited by examiner

*Primary Examiner*—Amare Mengistu
*Assistant Examiner*—Premal Patel

(57) ABSTRACT

Optical tracking systems, method, and devices are described in which optical components detect light within a substantially planar region adjacent to a user device. Tracking logic may receive signals output by the optical components and determine coordinates associated with a movement of a pointing object through the substantially planar region. The tracking logic may then provide for translation of the coordinates into an action on a display, such as, for example, a movement of a cursor or other icon on the display.

20 Claims, 8 Drawing Sheets

OPTICAL TRACKER WITH TILT ANGLE DETECTION

TECHNICAL FIELD

This description relates to optical tracking techniques.

BACKGROUND

Tracking and/or pointing applications allow users to interact with computers and other devices in a fast, easy, and intuitive manner. An example of a tracking application is the well-known computer mouse, which allows users, for example, to control movement of a cursor or other icon within the context of a monitor or other display. Other tracking applications include touchpads that track a movement of a finger or other pointing device across a pressure-sensitive surface.

Optical tracking systems generally rely on some type of emission, reflection, and/or detection of light, that is translated, for example, into movement of a cursor or other icon within the context of a monitor or other display.

SUMMARY

Examples of optical tracking systems are described in which optical components (e.g., image sensors) detect light within a substantially planar region adjacent to a user device. Tracking logic may receive signals output by the optical components and determine coordinates associated with a surface-independent movement of a pointing object through the substantially planar region. For example, the pointing object may be moved through an open space adjacent to the device, without contact of the pointing object on a physical surface. The tracking logic may then provide for translation of the coordinates into an action on a display, such as, for example, a movement of a cursor or other icon on the display.

For example, a row of pixels of a 1-dimensional image sensor (or a designated row of pixels among a plurality of rows of pixels, e.g., in a 2-dimensional image sensor) may be used to detect the movement of the pointing object. Since 1-dimensional image sensors may have a limited field of view, corresponding, for example, to such a single row of pixels within the image sensor(s), pixels from such an image sensor may be effectively limited to detecting light within the substantially planar region and within a vicinity of the device. Then, the movement of the pointing object within the substantially planar region may be characterized using pixel values corresponding to light reflected from the pointing object within the substantially planar region, as the pointing object is moved through the substantially planar region.

In one example, two image sensors are used that are each disposed at least partially within the substantially planar region, so that the substantially planar region includes at least a part of each of the image sensors and at least a part of the pointing object. In this example, both image sensors detect the part of the pointing object within the substantially planar region, and triangulation calculations may be performed to determine x, y coordinates associated with the movement of the pointing object. In another example, only one image sensor is used, and x, y coordinates associated with the movement of the pointing object may be determined based on an apparent size of the part of the pointing object in the substantially planar region, relative to reference size information (e.g., a known diameter) of the part of the pointing object.

Further, additional optical sensing may be provided by virtue of a secondary substantially planar region in parallel with the substantially planar region (e.g., by using one or more additional image sensors to detect light from the secondary substantially planar region). Then, by tracking movement in the secondary substantially planar region (e.g., using the same techniques as just described), additional information may be obtained for controlling an action on a display. For example, a tilt of a finger that intersects both the substantially planar region and the secondary substantially planar region may be detected and translated into a desired action with respect to the display, such as, for example, an up-or-down scrolling through a text screen.

This Summary is provided to introduce selected concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
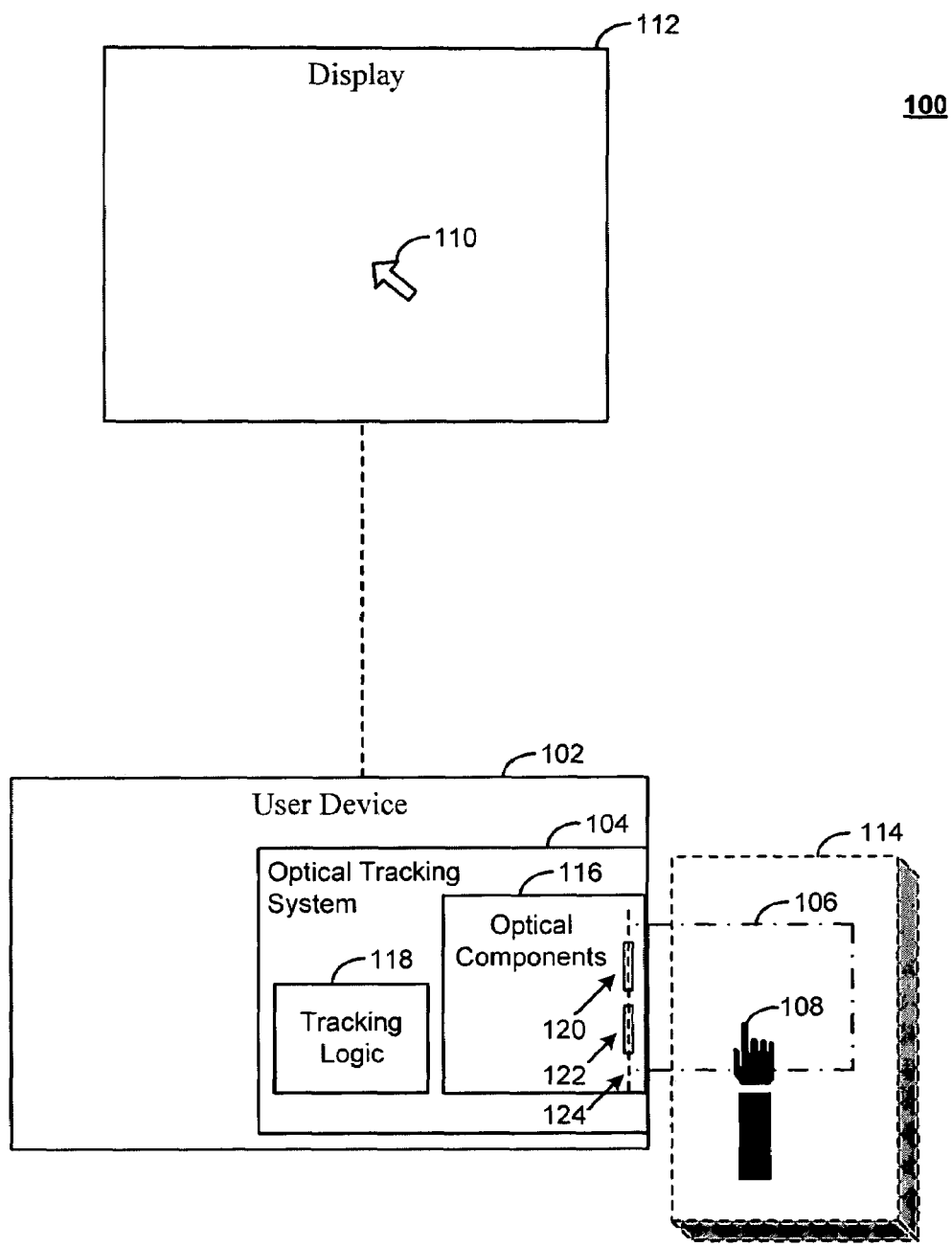
FIG. 1 is a block diagram of a system for performing optical tracking.

FIG. 1 is a block diagram of a system 100 for performing optical tracking. In the example of FIG. 1, a user device 102 is illustrated that includes an optical tracking system 104. The optical tracking system 104 is operable to detect light from a substantially planar region 106. For example, the optical tracking system 104 may detect light reflected from a pointing object 108 (illustrated as a finger in the example of FIG. 1), so as to detect movement of the pointing object 108 through the substantially planar region 106. Then, the optical tracking system 104 may determine coordinates describing the movement of the pointing object 108 within the two dimensions (i.e., in an x and/or y direction) of the substantially planar region 106, and provide for translation of the coordinates into movement of a cursor 110 or other icon on a display 112.

In the example of FIG. 1, the user device 102 may represent virtually any type of device that may be operated by a user (i.e., the user providing and moving the pointing object 108). For example, the user device 102 may include one or more of a keyboard, a mouse, a wireless communications device, a personal digital assistant, a desktop computer, a tablet personal computer, a cell phone, a gaming device, and/or a laptop computer. Further, although the display 112 is illustrated separately in the example of FIG. 1, it should be understood that the user device 102 also may include, or may be associated with, a monitor or other display.

The optical tracking system 104 is operable to detect light from the substantially planar region 106 by, for example, effectively limiting a viewing field in which light is detected. For example, the optical tracking system 104 may provide only a limited number or distribution of light-sensitive pixels. As another example, the optical tracking system 104 may provide a larger number or distribution of light-sensitive pixels, and then discard information from all but specified ones of the pixels that correspond to the substantially planar region 106.

Accordingly, the substantially planar region 106 may be understood to be included in a defined viewing field of the optical tracking system 104 (e.g., defined by appropriate provision, selection and/or activation of corresponding pixels). That is, as long as the pointing object 108 is moved within the viewing field of the optical tracking system 104 and within a certain distance of the user device 102, then light reflected from the pointing object 108 may be detected and analyzed with respect to the substantially planar region 106, for purposes of control of the cursor 110. In this regard, the distance within which light reflected from the pointing object 108 is detected for purposes of control of the cursor 110 may be determined or designated by various techniques (as discussed below, for example, with respect to FIG. 2). Generally, however, it should be understood that the user may effectively determine this distance in practice, simply by noticing a distance at which an accuracy of control of the cursor 110 begins to suffer, and then staying comfortably within this distance during operation of the optical tracking system.

Based on the above description, it should be understood that designation of the substantially planar region 106 as such is not intended to imply the mathematical definition of a plane as having infinite extent and no thickness. Rather, the substantially planar region 106 represents a generally flat or level shape or surface within a space adjacent to the user device 102, that, as just described, may be specified by appropriate provision, selection, and/or activation of pixels of the optical tracking system 104. Therefore, the substantially planar region 106 does not necessarily represent, and is not limited to, a literal two-dimensional surface or space, but, rather, provides an effective two-dimensional space for purposes of control of the cursor 110.

The more the substantially planar region 106 is (or can be) limited in thickness (e.g., by appropriate sensor/pixel selection), the less opportunity may exist for errors or inaccuracies in determining the movement of the pointing object 108. For example, when the pointing object 108 includes a finger, as in the example of FIG. 1, an increased thickness of the substantially planar region 106 may result in inaccuracies resulting from surface inconsistencies in the finger through the substantially planar region 106, as detected by the optical tracking system 104.

Although the pointing object 108 is illustrated in the example of FIG. 1 as a finger, it should be understood that virtually any type of pointing object may be used that is operable to provide a sufficient level of reflection of light for detection by the optical tracking system 104. For example, a stylus or pen may be used, where the stylus or pen may have a defined shape (e.g., round or square). In some implementations, reflecting material may be added to, or incorporated into, the pointing object 108, to increase an ease of detection by the optical tracking system 104. In other implementations, a light source (e.g., an light-emitting diode (LED)) may be included on the pointing object 108, in order to increase an amount of light detected by the optical tracking system 104.

The cursor 110 is used to represent an example of a traditional type of cursor or other icon that may be controlled on the display 112 to obtain a desired action and/or result. For example, virtually any cursor control action of the cursor 110 that may be obtained by conventional mouse or touch-sensitive tracking surfaces may generally be provided on the display 112 by the optical tracking system 104, using one or more of the techniques described below with respect to FIGS. 2-6. For example, movement of the cursor 110 to a desired portion of the display 112 may be performed, or selection of a particular file, document, or action that is designated on the display 112 may be performed. As a further example, a drawing function may be performed, in which movement of the cursor 110 provides a line drawing or similar effect on the display 112. Also, specialized actions may be provided, including, for example, photo-editing functionality, web-browsing functionality, or gaming functionality.

The display 112 may be virtually any display that may be used with the user device 102. For example, the display 112 may be integrated with the user device 102 (such as with a laptop computer, personal digital assistant, or mobile telephone), or may be separate from the user device 102 and in (wired or wireless) communication therewith (such as a monitor associated with a desktop computer, or with a television).

Further in FIG. 1, an optional surface 114 is shown in order to illustrate a capability of the optical tracking system 104 to detect surface-independent movements of the pointing object 108. For example, in a case where the user device includes a keyboard, the surface 114 may represent a desk on which the keyboard rests. A user may control the cursor 110 simply by moving his or her finger (pointing object 108) within the substantially planar region 106. If the substantially planar region 106 is over the surface 114 (e.g., desk), then the user may trace his or her finger along the desk and within the substantially planar region 106; however, it should be understood that operation of the optical tracking system 104 is not dependent on such contact between the finger and the desk to perform accurate optical tracking.

For example, if the keyboard (user device 102) rests at the edge of a desk or other surface, then there may be no surface under the substantially planar region 106, and the pointing object 108 may be moved in free and open space. As long as at least a part of the pointing object 108 moves within the substantially planar region 106, then the desired action on the display 112 may be obtained.

Continuing the example of a keyboard, it may be the case that the user device 102 is a keyboard intended for use with television and/or media center systems (e.g., media centers that allow users to access computer files by way of a television). Such a keyboard may thus be primarily intended for use in a living room or other non-traditional space for operating a keyboard and/or controlling a display, where a desktop may not be practical or available. In these cases, the substantially planar region 106 may be provided adjacent to the keyboard (e.g., vertically from a top surface of the keyboard), so that movements of the pointing object 108 within a free space included in the substantially planar region 106 may be tracked without reference to, dependence on, or touching of, a physical surface such as the surface 114.

Similarly, in other examples, the user device 102 may include a wireless communications device and/or a gaming device. Such devices, and similar devices, may be frequently used while being held in a hand of a user. In these cases, movement of the pointing object 108 may occur within the substantially planar region 106 in an open space adjacent to an edge surface of the user device 102, so that cursor control actions or other actions may be obtained on a display of the user device 102. Such implementations may allow, for example, a relatively larger display on the mobile device, since less space for user controls may be required.

In these and other implementations, the optical tracking system 104 may include optical components 116 that are operable to sense movements, including such surface-independent movements, and output pixel values corresponding thereto. Then, tracking logic 118 may be operable to receive the pixel values, and determine coordinates of the pointing object 108 within the substantially planar region 106 therefrom. Thus, the tracking logic 118 may provide for translation of the coordinates into an action on the display 112, such as, for example, cursor control actions for controlling the cursor 110.

For example, the optical components 116 may include one or more sensors, such as the sensors 120 and 122. For example, the sensors 120 and 122 may operate by capturing light on grids of pixels on their respective surfaces, which may be formed by photosensitive diodes that also may be referred to as photosites, and that record an intensity or brightness of the detected light by accumulating a charge. The sensors 120 and 122 may include, for example, complementary metal-oxide-semiconductor (CMOS) sensors, or may include any other image sensor this is operable to detect light from the substantially planar region 106 and output a signal corresponding to an intensity or other characteristic of the light, such as, for example, a charge-coupled device (CCD) sensor. In some implementations, the sensors 120 and 122 may include CMOS image sensors having a linear response characteristic(s), so that a response of the sensors 120 and 122 varies linearly with an intensity of the detected light.

In the example of FIG. 1, the sensors 120 and 122 are each disposed at least partially within the substantially planar region 106, and, more specifically, are disposed substantially along an axis 124 that is included within the substantially planar region 106. For example, the axis 124 may be defined along a first row of pixels within the sensor 120 and a second row of pixels within the sensor 122, so that these rows of pixels are included within the substantially planar region 106. By using only these rows of pixels, light detected by the sensors 120 and 122 may substantially correspond only to light within the substantially planar region 106.

In so doing, several advantages may be obtained in the example implementation of FIG. 1. For example, placement of the sensors 120 and 122 beside one another allows for a compact and discrete construction of the optical tracking system 104. Also, restricting the field of view of the sensors 120 and 122 reduces an area of the pointing object 108 that is detected by the sensors 120 and 122, which implies less opportunities for errors resulting from, for example, any surface irregularities on the pointing object 108. Further, since less information is collected by the sensors 120 and 122 than if a wider field of view were employed, calculations to be performed by the tracking logic 118 may be reduced and/or simplified, and a reliability of results may be increased. Additionally, such construction and use of the sensors 120 and 122 allows for the use of 1-dimensional (1-D) sensors, which may be inexpensive compared to larger pixel arrays.

In FIG. 1, although the sensors 120 and 122 are illustrated and described as being included in the substantially planar region 106, and although movement of the pointing object 108 is illustrated and described as occurring within the substantially planar region 106, it should be understood that there is no requirement or limitation that movement of the pointing object 108 should or must be able to occur (and be detected) within an entirety of the substantially planar region 106. For example, as illustrated and discussed below with respect to FIG. 2, various other optical components may be included in optical components 116, such as lenses, light sources, or filters, and such optical components may be placed in between the sensors 120 and 122 and the pointing object 108. Additionally, as described below with respect to FIG. 2, a "dead zone" may exist immediately outside of the optical components 116, i.e., a limited region in which movement of the pointing object 108 may not be (sufficiently) accurately tracked.

In an implementation of the example of FIG. 1, a triangulation calculation is performed using the sensors 120 and 122 and the pointing object 108. Specifically, for example, and as described in more detail with respect to FIG. 2, each sensor 120 and 122 may output pixel values from a row of pixels along the axis 124 to the tracking logic 118, the pixel values corresponding to light reflected from the pointing object 108. Then, the tracking logic 118 may determine a centroid or center of the pointing object 108 within the substantially planar region 106, simply by, for example, taking a centermost pixel(s) from each of the two rows of pixels that register reflected images of the pointing object 108 along the axis 124. Accordingly, the tracking logic 118 may perform a triangulation calculation using the two centroids, together with other pre-determined information about the optical components 116 (such as, for example, a known spacing between the sensors 120 and 122, and/or a known spacing between each of the sensors 120 and 122 and corresponding lenses used to focus the light reflected from the pointing object 108 onto the sensors 120 and 122).

Thus, the tracking logic 118 may determine, from the triangulation calculation, coordinates of the pointing object 108 within the substantially planar region 106. For example, the tracking logic 118 may determine either relative or absolute coordinates of the pointing object. For example, determining relative coordinates may refer to determining a current coordinate of the pointing object 108 within the substantially planar region 106, relative to an immediately-past coordinate, and without reference to any other frame of reference in or around the substantially planar region 106. Such relative tracking is typically performed, for example, in many conventional mouse tracking devices, where movement of the mouse on a surface is not required to be within any particular defined field, but rather may occur on any suitable surface (with the user being responsible for orienting a corresponding cursor movement in a desired fashion relative to a display). Absolute coordinates, on the other hand, may refer to coordinates defined with respect to a fixed frame of reference. For example, if light from the substantially planar region 106 is detected immediately in front of the display 112, then the perimeter of the display 112 may be used to define coordinates determined by the tracking logic 118. As a result, in such examples, movement of the pointing object 108 in a particular region of the substantially planar region 106 and over a region of the display 112 will result in corresponding movement of the cursor 110 (or other action) within the corresponding display region.

Although the tracking logic 118, and the optical tracking system 104 as a whole, is illustrated in the example of FIG. 1 as being implemented as a single block or module within the user device 102, it should be understood that some or all of the tracking logic 118 may be implemented outside of the user device 102, and may be implemented in/by multiple instances and types of devices, peripherals, hardware, software, and/or firmware.

For example, the tracking logic 118 may include a processor (e.g., a micro-programmed control unit (MCU)) that is operable to control the sensors 120 and 122, by, for example, providing power and timing information to the sensors 120 and 122. In other words, for example, such a processor may be used as part of the (synchronized) selection and activation of desired rows of pixels of the sensors 120 and 122 that results in effective tracking of the pointing object 108 through the substantially planar region 106, by, for example, limiting obtained pixel values from the sensors 120 and 122 to pixel values from rows of pixels on each of the sensors 120 and 122 that lie substantially along the axis 124.

Additional computing resources (e.g., software or firmware) may be used to receive pixel values from, for example, the processor just mentioned, and perform calculations and other analysis thereof. For example, software may be used that has access to pre-defined information about the optical components 116 (e.g., a spacing between the sensors 120 and 122), so that such software may use such information to perform the triangulation calculations referenced above and described in more detail below with respect to, for example, FIG. 2.

By way of example, then, elements of the tracking logic 118 may be implemented in a single component (which may be internal or external to the user device 102), or in multiple components in communication with one another (any one, or all, of which may be internal or external to the user device 102). For example, a processor within the user device 102 (e.g., a keyboard) may be in communication with a separate computing device (e.g., a desktop computer) by way of a serial port or other wired connection, or by way of a wireless connection, in order to transmit pixel values and/or full or partial results of calculations based on the pixel values.

Additionally, the tracking logic 118 may be directly or indirectly involved in providing results of the calculations (e.g., calculated coordinates of the pointing object 108) for actual translation into an action on the display 112. For example, in one implementation, the tracking logic 118 may be wholly responsible for translating relative coordinates of the pointing object 108 within the substantially planar region 106 into absolute coordinates associated with the frame of reference of the display 112. However, such translation of relative coordinates of a tracking system (e.g., a conventional mouse) into absolute coordinates of a display may already be performed by existing systems. Therefore, it may be advantageous or efficient for the optical tracking system 118 to take advantage of existing software or firmware associated with the display 112, the user device 102, and/or a separate computing device (such as a desktop computer, not shown in FIG. 1). For example, the tracking logic 118 may output coordinates according to a format that matches an output of a conventional mouse, so that software or firmware receiving the coordinates may not require modification to operate with the optical tracking system 104.

In addition to the various actions described above that may be provided with respect to the cursor 110 on the display 112, it should be understood that other, secondary actions may be provided. For example, a movement of the pointing object 108 in a direction perpendicular to the substantially planar region 106 may cause the pointing object 108 either to begin intersecting the substantially planar region 106, or to cease intersecting the substantially planar region 106. Such movements may be detected by a corresponding presence or absence of reflected light detected by the sensors 120 and 122, (e.g., a new determination of coordinates of the pointing object 108 within the substantially planar region 106), and the secondary actions may be performed based thereon. For example, such movements may result in a secondary action such as a "clicking" or selection of a file, document, or hypertext link on the display 112 to which the cursor 110 is pointing. As another example of secondary actions that may be provided, movements within the substantially planar region 106 may be interpreted as gestures associated with particular functionality of the display 112. For example, a rapid movement (or succession of movements) to the left within the substantially planar region 106 may be interpreted as a command to go "back" to a previous page within a browser, while a rapid movement to the right within the substantially planar region 106 may be interpreted as a command to go forward to a next page.

Figure 2:
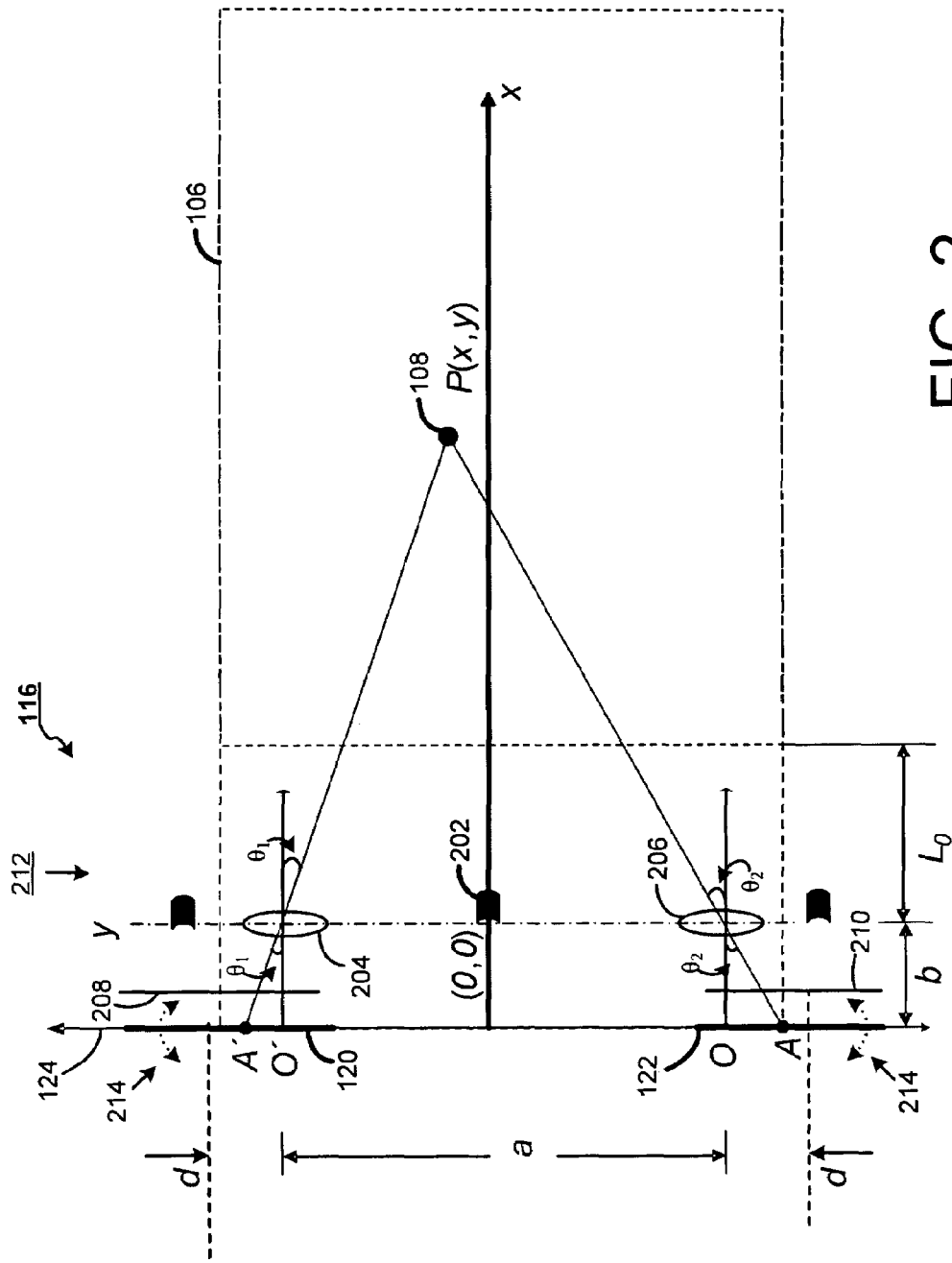
FIG. 2 is a diagram of an example implementation of the optical tracking system of FIG. 1.

FIG. 2 is a diagram of an example implementation of the optical tracking system 116 of FIG. 1. FIG. 2 provides a more detailed view of a particular example of the sensors 120 and 122, disposed along the axis 124 as described and illustrated above with reference to FIG. 1. Additionally, FIG. 2 illustrates the substantially planar region 106, as well as the pointing object 108. FIG. 2 also illustrates that the substantially planar region 106 includes, in the example of FIG. 2, a dead zone "$L_0$" in which tracking of the pointing object 108 is limited or non-existent (e.g., due to non-overlap of fields of view of the sensors 120 and 122 within the dead zone $L_0$).

Also, as should be understood from the above discussion with respect to FIG. 1, the illustrated outline of the substantially planar region 106 in FIG. 2 is not intended to illustrate an absolute cut-off point or boundary, since, as explained, an effectiveness of the optical components 116 may diminish gradually over a distance therefrom. Thus, a design of the optical components 116 may be implemented with the intent that the substantially planar region 106 allows sufficient area for controlling the cursor 110 on the display 112; however, it should be understood that if a user moves beyond this area, then control of the cursor 110 may diminish or cease. Nonetheless, in some implementations, physical perimeter(s) may be separately associated with the substantially planar region 106 and provided for a user. For example, the surface 114 may include a drawing surface that is attached or attachable to the user device 102, on which a drawing perimeter is defined that is pre-calibrated to be safely within the substantially planar region 106. In this way, a user may be assured of remaining within the substantially planar region 106 by staying within the identified perimeter, and, moreover, the optical tracking system 104 may be calibrated to use the drawing perimeter as a frame of reference for absolute tracking of the pointing object 108 with respect to the display 112.

FIG. 2 also illustrates examples of other components that may be included within the optical components 116. For example, light source(s) 202 include, in the example of FIG. 2, a plurality of light-emitting diodes (LEDs), which emit light into the substantially planar region 106. The light is reflected off of the pointing object 108 and received at the sensor 120 and the sensor 122 through a first lens 204 and a second lens 206, respectively, as shown. Although three light-sources 202 are illustrated, it should be understood that more or fewer may be used. For example, no light sources 202 may be used in a case where ambient light is used to detect the pointing object 108, or when the pointing object 108 itself includes a light emitting source.

As illustrated in the example of FIG. 2, then, the light sources 202 project light from the optical components 116. This light is reflected from the pointing object 108, and a portion of the reflected light that is within the substantially planar region 106 is detected by the sensors 120 and 122. This light may be detected by a row of pixels at each of the sensors 120 and 122. The two rows of pixels may each be analyzed by the tracking logic 118 to determine a centroid thereof, e.g., a centroid A' is determined from a row of pixels from the sensor 120, and a centroid A is determined from a row of pixels from the sensor 122.

In the case where only a row of pixels is designated for use in each sensor 120 and 122, calculation of the centroids A and A' may simply involve determining a center-most pixel(s) in each designated row(s). Such a determination may be made quickly, easily, and reliably, even during rapid movements of the pointing object 108. In other cases, it may be possible to use multiple rows of pixels of each of the sensors 120 and 122, and then discard all pixel values outside of designated row(s) of each of the sensors 120 and 122 on the axis 124. In still other cases, a plurality of rows of pixels may be read out of each of the sensors 120 and 122, and then the centroids A and A' may be calculated from each plurality, using known techniques (e.g., dividing a total shape of each plurality into known shapes, and then calculating the centroids A and A' from a summation of the areas of the known shapes).

In the example of FIG. 2, the lenses 120 and 122 are illustrated as being placed along a "y" axis with a separation "a" between points "O" and "O'," where the latter points are aligned with the centers of the lenses 204 and 206, respectively. The sensor 120 and the sensor 122 are placed a distance "b" behind the lens 204 and the lens 206, respectively. A center of the sensor 120 is placed a distance "d" above the point O', while the sensor 122 is placed a distance "d" below the point O.

A filter 208 is placed between the lens 204 and the sensor 120, and a filter 210 is placed between the lens 206 and the sensor 122. The filters 208 and 210 may be used, for example, to filter out light that is not associated with the LEDs 202, so that a sensitivity of the sensors 120 and 122 may effectively be increased. Additionally, or alternatively, light from the LEDs 202 may be modulated or otherwise controlled, in conjunction with control of a timing of image-taking by the sensors 120 and 122, so as to synchronize projection of light and detection of reflected signal(s) from the pointing object 108 in an efficient and effective way.

With the information related to the centroids A and A', as well as the known quantities a, b, O, and O', the tracking logic 118 may determine x, y coordinates for the pointing object 108, using, for example, various triangulation techniques. For example, an equivalence of angles $\theta_1$ and $\theta_2$ may be used to define two equations in the two unknowns x, y, in terms of the known quantities "a," "b," and the detected pixel lengths "OA," and "O'A'" (i.e., a quantity of pixels between start and end points O, O', A, and A'). Then, these equations may be solved for x, y to obtain Eqs. (1)-(2):

$$x = \frac{ab}{O'A' - OA} \quad \text{Eq. (1)}$$

$$y = \frac{a}{2} - \frac{aO'A'}{O'A' - OA} \quad \text{Eq. (2)}$$

In order to obtain a desired range of coverage for the substantially planar region 106, values of x, y may be inserted into Eqs. (1) and (2) to obtain required/workable ranges or values for a, b, OA, and/or O'A'. For example, the values of pixel lengths OA and O'A' may be obtained for a desired x, y range and for known values of a and b, using Eqs. (3) and (4):

$$O'A' = \frac{b\left(\frac{a}{2} - y\right)}{x} \quad \text{Eq. (3)}$$

$$OA = \frac{-b\left(\frac{a}{2} + y\right)}{x} \quad \text{Eq. (4)}$$

As the pointing object 108 moves within the substantially planar region 106, the pixel length end points A and A' will shift on the sensors 122 and 120, respectively. The optical components 116 may therefore improve resolution and/or coverage area by arranging for the shifting range of A and A' to equal a length of the sensors 120 and 122, thereby maximizing usage of an area(s) of the sensors 120 and 122). For example, as shown, the sensors 120 and 122 may be arranged off-center from the lenses 204 and 206, with the offset d. In this way, for example, full coverage of the substantially planar region 106 may be obtained, and most or all overlapping (and therefore wasting) of pixels of the sensors 120 and 122 may be eliminated. In other implementations, however, the points O and O' may be defined at a center of the sensors 122 and 120, respectively, or at another desired location.

A resolution of the image sensors 120 and 122 that may be used in the optical components 116 may be, for example 1024, 2048, or 4096 pixels. Of course, any appropriate resolution that is able to provide a needed or desired resolution for controlling the cursor 110 on the display 112 may be used. The lenses 204 and 208 may have, for example, focal lengths of 3.3 mm, and viewing angles of ninety-two degrees, or any other focal length or viewing angle that is operable to provide accurate tracking of the pointing object 108.

In some implementations, the filters 208 and 210 may be provided as a film on the sensors 120 and 122, respectively. In other implementations, the filters 208 and 210 may be provided as discrete components that are separate from the sensors 120 and 122. In operation, the filters 208 and 210 prevent light that is reflected from the pointing object 108 but that does not match a wavelength of the source light(s) 202 from reaching the sensors 120 and 122.

Further, as shown in FIG. 2, a material 212 may be included between the LEDs 202 and the substantially planar region 106. The material 212 may include, for example, ground glass, and may serve, for example, to smooth out any non-uniformities that may be present in light from the light sources 202. In this way, shadows, un-wanted reflections (e.g., from ancillary objects in the vicinity of the substantially planar region 106), and other undesirable artifacts may be minimized, so that the desired reflections from the pointing object 108 may be detected reliably.

Although components of FIG. 2 are illustrated to provide a particular example of the optical components 116, it should be understood that many other implementations may be used. For example, as indicated by arrows 214, the sensors 120 and 122 may be rotated along the axis 124 and in the plane of the substantially planar region 106. Such rotations may serve either to reduce the dead zone $L_0$, or to increase a range at which reflected light from the pointing object 108 in the substantially planar region 106 is detected.

For example, the sensors 120 and 122 may be angled inward toward one another along the axis 124, so as to cause viewing areas of the sensors 120 and 122 to overlap closer to the y axis of FIG. 2, i.e., in an area within the example dead zone $L_0$ of FIG. 2. In this way, movements of the pointing object 108 through the substantially planar region 106 may be tracked more closely to the user device 102. Such implementations may be useful, for example, when the user device is compact in size, such as a mobile phone or personal digital assistant.

In other implementations, however, it may be desired to increase an area of the substantially planar region 106, so that movements of the pointing object 108 may be tracked further from the user device 102 than in the illustrated example of FIG. 2. In this case, the sensors 120 and 122 may be angled more outward and/or away from one another along the axis 124. It should be understood that such implementations may serve to increase an area of the substantially planar region 106, with an accompanying increase in the dead zone $L_0$. Such implementations may be useful, for example, where a greater range of detection is desired. In these and other implementations, modifications to the triangulation techniques described above (and/or below, with respect to FIG. 5) may be implemented to reflect the change(s) in configuration of the optical components 116 (e.g., the angling of the sensors 120 and 122 indicated by the arrows), as would be apparent.

Figure 3:
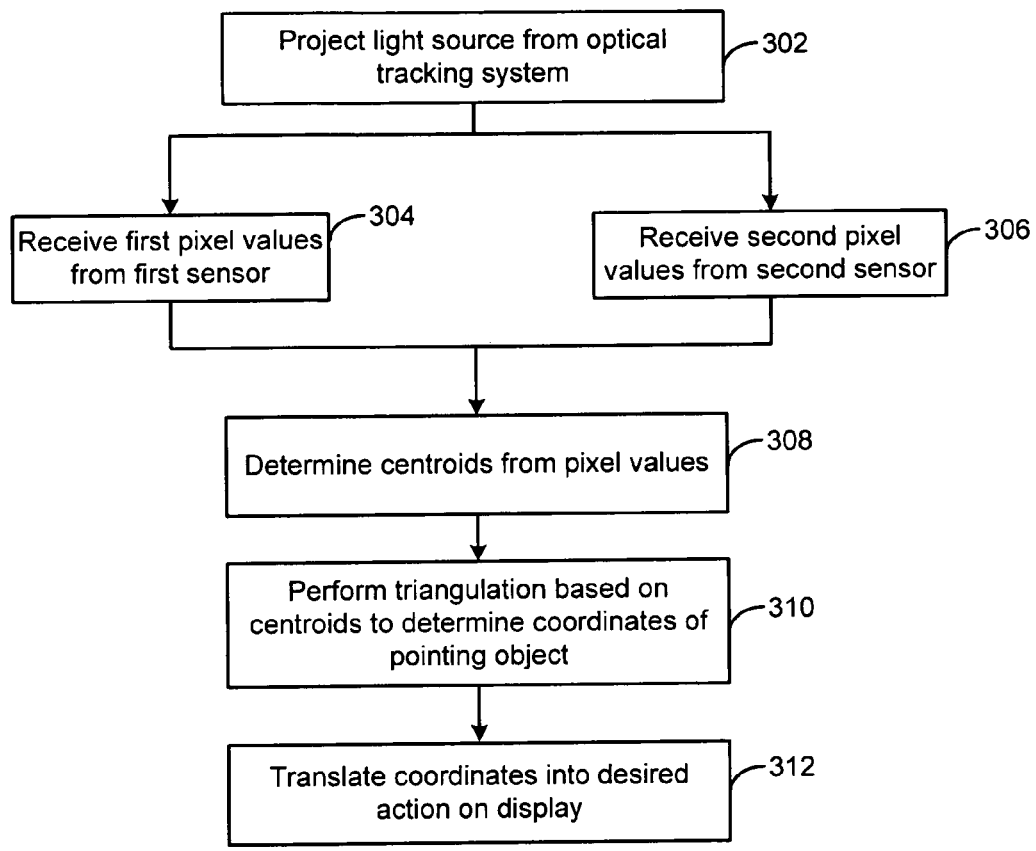
FIG. 3 is a flowchart illustrating a process of the system(s) of FIGS. 1 and/or 2.

FIG. 3 is a flowchart 300 illustrating a process of the system(s) of FIGS. 1 and/or 2. In the example of FIG. 3, a light source is projected from an optical tracking system into an adjacent area (302). For example, as described, light from the LEDs 202 may be projected so as to illuminate at least the substantially planar region 106. Of course, other light sources may be used, including laser light sources. Also, as already mentioned with respect to FIG. 2, ambient light may be used, in which case no projected light may be required. Additionally, an amount or quantity of light may be selected for a given application; e.g., although three LEDs 202 are shown in FIG. 2, an appropriate number of one or more LEDs may be selected, as necessary or desired.

Further, in projecting the light, beam-forming components may be used within the optical components 116 that enhance an ability of the sensors 120 and 122 to detect light reflected from the pointing object 108. For example, a light-forming technique may be used in which the source of light is located at a focal distance "f" of a cylindrical lens. In this example, the light source and the cylindrical lens produce light in a slice or fan region of produced light. Such a fan-shaped beam may be used to illuminate the pointing object 108, and provide an effective way to minimize interference (e.g., scattering that may occur from an ancillary surface and/or from a tilting of the pointing object 108). Such a fan beam also may provide an effective way to extend a detectable area in which the sensors 120 and 122 may accurately detect movement of the pointing object 108, and may increase a sensitivity of the optical tracking system 104 to lateral movements of the pointing object 108.

First pixel values are received from a first sensor, e.g., the sensor 120 (304), and second pixel values are received from a second sensor, e.g., the sensor 122 (306). For example, the sensor 120 and the sensor 122 may receive focused, filtered light reflected from the pointing object 108, and may each output corresponding pixel values. As described above and illustrated in FIGS. 1 and 2, the sensors may be disposed at least partially in a common plane, and included in the substantially planar region 106. Accordingly, the optical tracking system 104 may be made in a compact and modular form.

In receiving the pixel values, an output mode of the sensors 120 and 122 may be selected by the tracking logic 118 that appropriately outputs the desired pixel information, e.g., as a comparison voltage that provides information as to where the image(s) is and how many pixels are contained therein. The pixels may be read out according to certain pre-defined standards, e.g., pixel values below a certain threshold amount may not be kept, and activated pixels having a length of less than some predetermined amount (e.g., less than ten pixels) may be disregarded as noise.

Pixels may be read out according to a start signal and timing signal produced by the tracking logic 118, within a defined exposure time (i.e., within a defined number of clock cycles). In some implementations, prior to the obtaining/reading of pixel values from the sensors 120 and 122, a baseline reading of pixel values may be determined by, for example, reading out a certain number of pixels during a time when no light source is not being projected.

Centroids are determined from the pixel values (308). For example, during and/or after the reading/receiving of the pixel values, all pixels in a row (e.g., 2048 pixels) may be read out, and their positions recorded by the tracking logic 118, so that start and end points of the pixel values corresponding to light reflected from the pointing object 108 within the substantially planar region 106 may be determined.

Using these start and end points, the tracking logic 118 may determine centroids A and A', e.g., center-most pixel(s) from each of the two rows of pixels that register reflected images of the pointing object 108 along the axis 124. As described above with respect to FIGS. 1 and 2, determination of each centroid may include a single pixel at the centroids A and A', and, in other implementations, sub-pixel resolution may be obtained in determining the centroids A and A'.

Triangulation may then be performed based on the determined centroids, in order to determine coordinates of a pointing object (e.g., the pointing object 108) during movement thereof through the substantially planar region 106 (310). For example, in the example of FIG. 2, the tracking logic 118 may use the distance "a" between centers of the lenses 204 and 206 and the distance "b" between the sensors 120/122 and lenses 204/206 to calculate from Eqs. (1) and (2) the x, y coordinates of the pointing object 108 during movement thereof through the substantially planar region 106. Thus, absolute and/or relative position/movement information of a pointing object (e.g., the pointing object 108) may be determined. For example, an absolute position within the substantially planar region 106 may be determined (e.g., determined absolutely with reference to some pre-defined perimeter coordinates/frame of reference, such as a boundary of the display 112), and/or a relative motion of the pointing object 108 may be determined.

Finally, the determined coordinates may be provided for translation into a desired action(s) on a display (312). For example, as described above with respect FIG. 1, the tracking logic 118 may translate movement of the pointing object 108 into movement of the cursor 110 of the display 112. As another example, the tracking logic 118 may provide the coordinates to an external system or computing resource for translation of the coordinates into the action on the display.

Figure 4A:
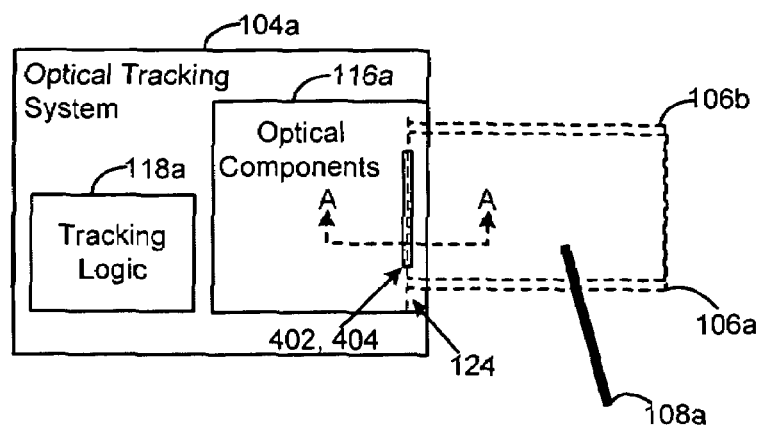
FIG. 4A is a block diagram of an alternate implementation of the optical tracking system of FIG. 1.
Figure 4B:
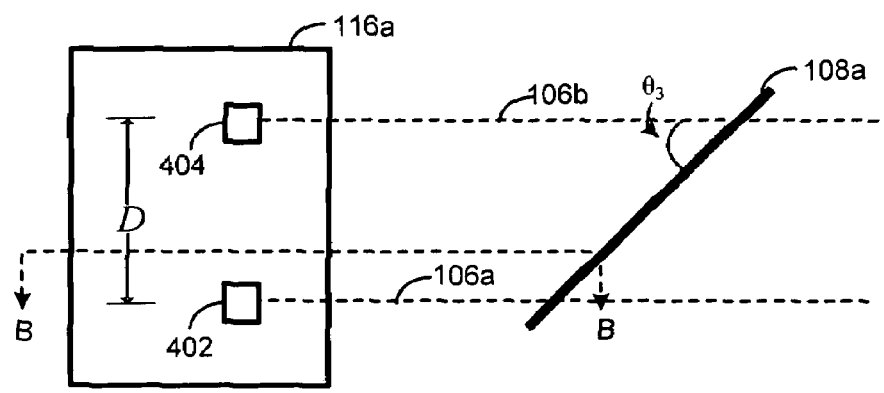
FIG. 4B is a sideview of the optical tracking system of FIG. 4A.

FIG. 4A is a block diagram of an alternate implementation of the optical tracking system of FIG. 1, and FIG. 4B is a sideview of FIG. 4A taken along cut-away line "A." In the example of FIG. 4A, an optical tracking system 104a is illustrated that includes optical components 116a and tracking logic 118a. More specifically, the optical components 116a and the tracking logic 118a are operable to detect light from two substantially planar regions 106a and 106b. By determining x, y coordinate information of a pointing object 108a (illustrated as a stylus in FIGS. 4A and 4B) within each of the substantially planar regions 106a and 106b, additional information about the movement of the pointing object 108a may be determined beyond the two x, y coordinate determinations. For example, a relationship between x, y coordinates in the substantially planar region 106a and x, y coordinates in the substantially planar region 106b may be determined, and an action on the display 112 may be provided by the tracking logic 118a, based on the relationship.

For example, as may be seen in FIG. 4B, the pointing object 108a may be maintained by a user at a tilt with respect to the substantially planar region 106a, e.g., may form an angle with respect to both of the substantially planar regions 106a and 106b. Then, an existence, degree, or direction of the tilt may be used to indicate a "scrolling-up" action through a document, while a tilt in a second direction may be used to indicate a "scrolling-down" action. Tilt information also may be used to achieve various other effects, such as, for example, a "back" or "forward" command within a web browser.

In the example of FIGS. 4A and 4B, two sensors 402 and 404 are illustrated as being operable to detect light from the substantially planar regions 106a and 106b, respectively. As described in more detail below with respect to FIGS. 5 and 6, the tracking logic 118a may determine the x, y coordinates of the pointing object 108a within the substantially planar region 106a based on apparent size information of the pointing object 108a detected by the sensor 402 (e.g., a number and/or distribution of pixels read from the sensor 402), relative to reference size information (e.g., relative to a known diameter of the pointing object 108a). Similarly, the sensor 404 may be used to determine the x, y coordinates of the pointing object 108a within the substantially planar region 106b based on apparent size information of the pointing object 108a detected by the sensor 404, relative to reference size information.

Once the two sets of x, y coordinates are known, a relationship between a first part of the pointing object 108a that is within the substantially planar region 106a and a second part of the pointing object 108a that is within the substantially planar region 106b may be obtained. For example, where a distance D between the two sensors 402 and 404 is known, the two sets of x, y coordinates may be used to determine an angle $\theta_3$ formed by the pointing object 108a with the substantially planar region 106b. For example, the distance D may be considered to form a leg of a right triangle having the pointing object 108a as its hypotenuse, and having a portion of the substantially planar region(s) 106a and/or 106b as the third leg. Then, other information about such a triangle, including the angle $\theta_3$, may be determined using well-known geometrical relationships.

Figure 5:
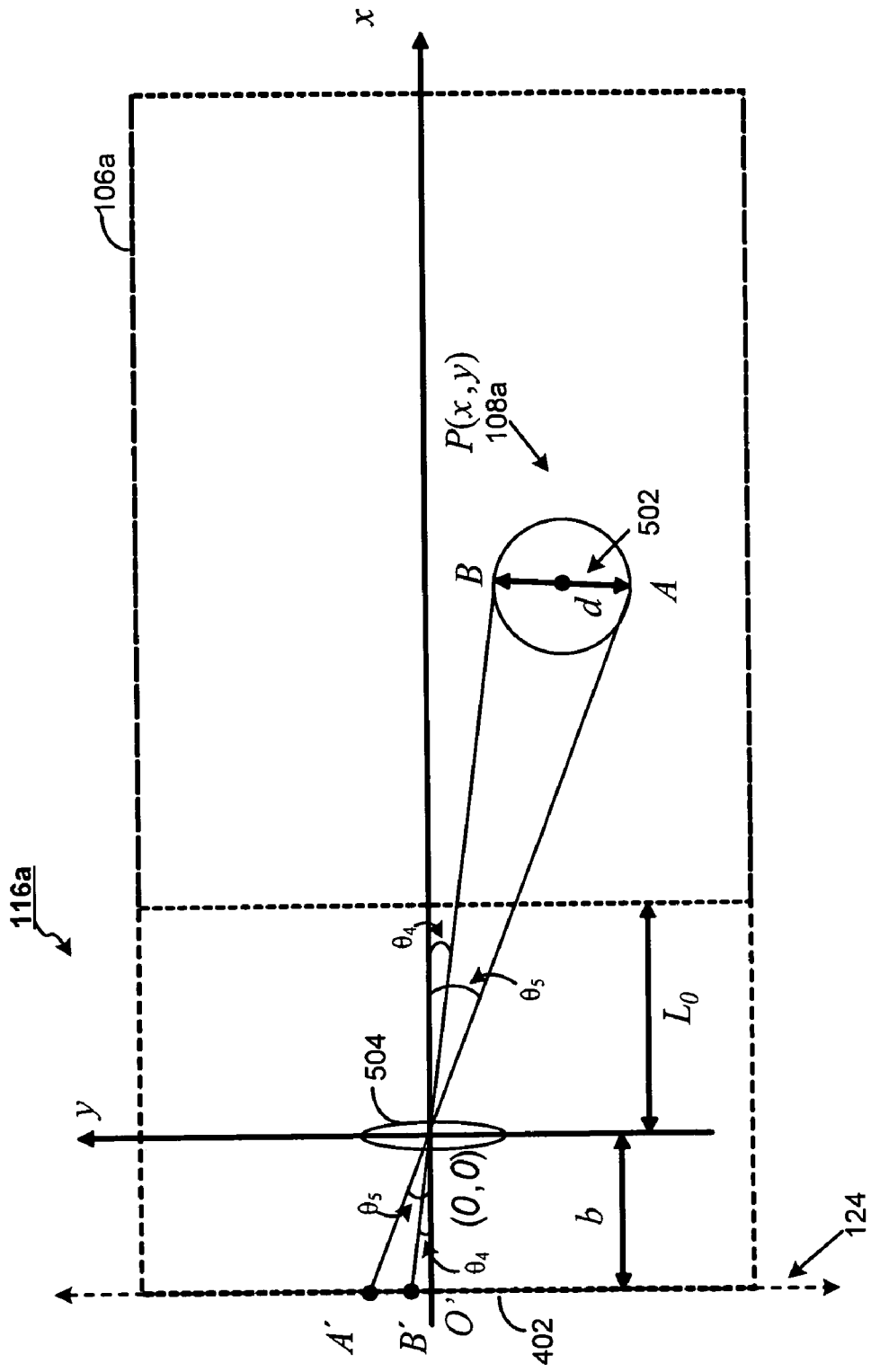
FIG. 5 is block diagram of a partial example implementation of the optical tracking system of FIGS. 4A and 4B.

FIG. 5 is block diagram of an example implementation of the optical tracking system 104a of FIGS. 4A and 4B, showing an example of the optical components 116a, and taken along a cut-away line B. Thus, in the example of FIG. 5, only the sensor 402 is illustrated, although it should be understood that the sensor 404 may be implemented in a similar way.

In FIG. 5, the pointing object 108a is illustrated as having a diameter 502. For example, in the case of FIGS. 4A and 4B, the pointing object 108a may include a substantially cylindrical stylus having a known diameter "d" 502. The sensor 402 may read out pixel values corresponding to light reflected from the pointing object 108a, and the tracking logic 118a may then determine apparent size information associated with the pointing object 108a from these pixel values.

For example, as illustrated in FIG. 5, the sensor 402 may read out start and end points of the pixel values, A' and B', respectively, corresponding to points A and B at ends of the diameter 502. In this regard, it should be understood from the description of FIGS. 1 and 2 above that the pixels read from the sensor 402 may be restricted to a designated and/or limited number of rows (e.g. a single row). In this way, light primarily from the substantially planar region 106a may be received at the sensor 402, so that calculations may be simplified, and reliability may be increased, as described above with respect to FIGS. 1 and 2.

Then, the endpoints A' and B' may be considered to provide apparent size information associated with the pointing object 108a, since, as should be understood from FIG. 5, motion of the pointing object 108a within the substantially planar region 106a will correspond to changes in the start and end points A' and B'. For example, as the pointing object 108a moves closer to the sensor 402 along an x axis, the distance A'B' will increase, and, conversely, as the pointing object 108a moves farther from the sensor 402, the distance A'B' will decrease.

This apparent size information may thus be compared with reference size information, such as the known diameter 502, in order to determine a location of the pointing object 108a within the substantially planar region 106a. For example, and similarly to the discussion above related to the triangulation calculations associated with FIG. 2, equivalent angles $\theta_4$ and $\theta_5$ may be used to determine x, y coordinates, based on known information including the distance "b" between the sensor 402 and a lens 504.

For example, such calculations may include use of Eqs. (5) and (6):

$$x = \frac{bd}{O'B' - O'A'} \quad \text{Eq. (5)}$$

$$y = \frac{d}{b}(O'B' + O'A') \quad \text{Eq. (6)}$$

In other implementations, a size or diameter of the pointing object 108a may not be known. In this case, however, absolute tracking may be performed by a calibration procedure for the optical tracking system 116a (e.g. allowing the optical tracking system 116a to determine pixel lengths corresponding to a given pointing object at a plurality of locations within the substantially planar region 106a, and then using the determined size information from the calibration procedure as the known size information). Also, relative tracking may be performed, by comparing the apparent size information to reference size information determined with respect to the pointing object 108a. For example, by selecting a detected size of the pointing object 108a at a given time "t," the tracking logic 118a may determine whether the pointing object 108a is moving closer or farther away from the sensor 402, by judging current, apparent size information against the determined reference size information.

Also, although the pointing object 108a is illustrated in FIGS. 4A and 4B as a stylus, it should be understood that virtually any pointing object may be used. For example, the pointing object 108a may have a square or other sharply-delineated outline, which may allow the sensor 402 (and 404) to easily detect the start and end points A' and B'. In other implementations, as in FIG. 1, a finger, pen, or any other convenient pointing object may be used.

Figure 6:
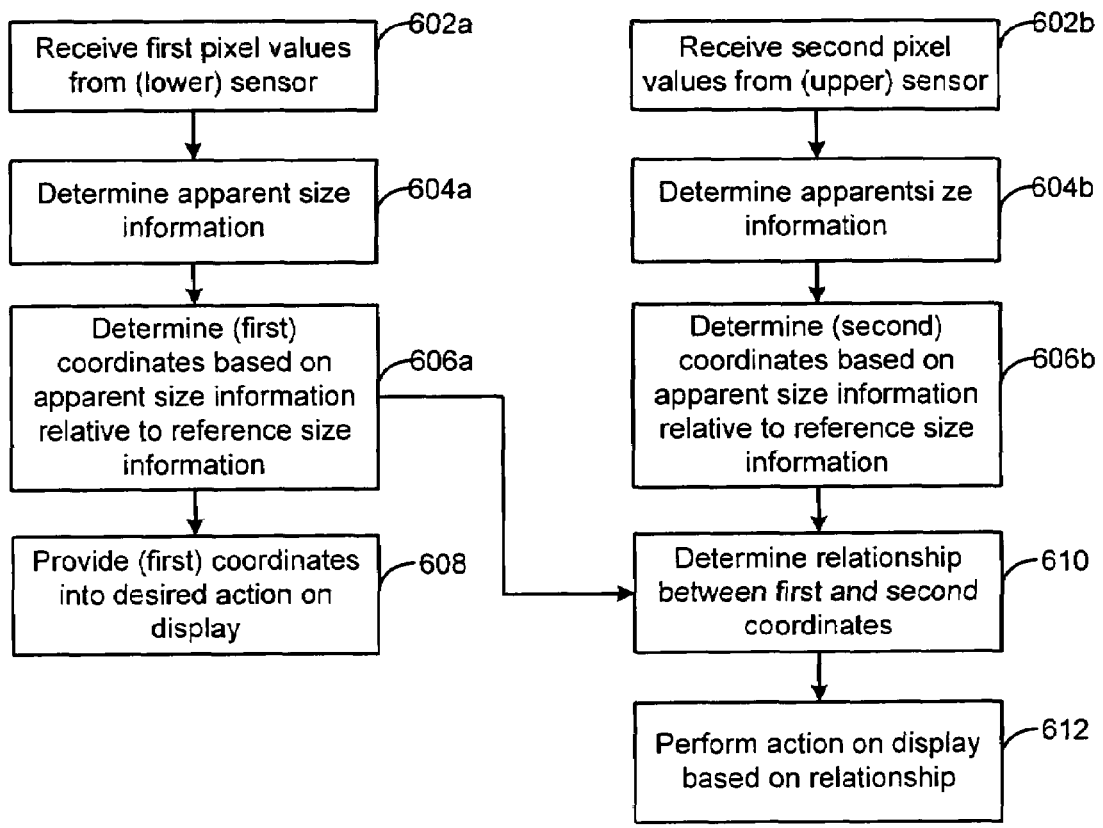
FIG. 6 is a flowchart illustrating a process of the systems of FIGS. 4A, 4B, and 5.

FIG. 6 is a flowchart 600 illustrating a process of the systems of FIGS. 4A, 4B, and 5. In the example of FIG. 6, parallel processes are illustrated that correspond to operations of the sensors 402 and 404. For example, first pixel values may be received by the tracking logic 118a from the sensor 402, which may be disposed beneath the sensor 404 (602a), as shown in FIG. 4A. Second pixel values also may be received from the sensor 404, which may be disposed above the sensor 402 (602b). As should be apparent from FIG. 4A and FIG. 4B, the first and second sets of pixel values correspond to first and second parts, respectively, of the pointing object 108a that intersect both of the substantially planar regions 106a and 106b, also respectively.

Then, apparent size information may be determined for the first part of the pointing object 108a (604a) and for the second part of the pointing object 108a (604b), using the first and second pixel values, respectively. For example, as described above with respect to FIG. 5 for the example of the single sensor 402, a number of activated pixels between start and end points B' and A' may correspond to apparent size information of a diameter of the pointing object 108a (i.e., for first and second diameters corresponding to the first and second parts of the pointing object 108a, respectively), since this number of pixels will change as the pointing object 108a moves within the substantially planar regions 106a and 106b.

Once the apparent size information is determined, then first x, y coordinates of the first part of the pointing object 108a in the substantially planar region 106a may be obtained, e.g., using Eqs. (5) and (6), above (606a). Similarly, second x, y coordinates of the second part of the pointing object 108a in the substantially planar region 106b may be obtained, e.g., using Eqs. (5) and (6), above (606b).

Then, the first x, y coordinates of the first part of the pointing object 108a within the substantially planar region 106a may be provided by the tracking logic 118a for use in providing an action on a display (e.g., the display 112) (608). In other words, once obtained, the first x, y coordinates detected with respect to the substantially planar region 106a may be used in much or exactly the same way as the x, y coordinates described above with respect to FIGS. 1-3 to obtain a desired action on the display 112. That is, the first x, y coordinates of the first part of the pointing object 108a may be used to provide cursor control actions, or any of the other actions described above with respect to FIGS. 1-3. In this regard, it should be understood that the sensor 402 and the substantially planar region 106a may provide such action(s) independently of the sensor 404 and the substantially planar region 106b.

Additionally, a relationship may be determined between the first x, y coordinates and the second x, y coordinates (610). For example, as described above with respect to FIG. 4, an angle of tilt that may exist between the substantially planar region 106b and the pointing object 108a may be determined, and used to provide an action on a display (e.g., the display 112) (612).

For example, in one implementation, the user device 102 may be a keyboard, and the substantially planar regions 106a and 106b may be provided to a side of the keyboard. Then, a user may move the pointing object 108a oriented perpendicularly to the surface 114 (e.g., a desk) on which the keyboard may rest, i.e. in a vertical direction, so as to move the cursor 110 on the display 112 while, for example, browsing a web page. In this case, light detected by the sensor 402 within the substantially planar region 106a may be used to control the cursor 110 in moving around the display 112 (e.g., within a web browser). Then, if the user tilts the pointing object 108a toward him or herself, this may be detected by the sensor 404, and interpreted by the tracking logic 118a as a command to scroll downward in the web page (or upward if the pointing object 108a is tilted away from the user). As another example, a tilt of the pointing object 108a to the left may be interpreted by the tracking logic as a command to go backward in the browser to a previous web page, while a tilt to the right may be interpreted as a command to go forward.

The tracking logic 118a also may be operable to implement variations on such commands by calculating other information about the relationship between the first x, y coordinates of the first part of the pointing object 108a in the substantially planar region 106a, and the second x, y coordinates of the second part of the pointing object 108a in the substantially planar region 106b. For example, the tracking logic 118a may determine a degree or extent of tilting of the pointing object 108a to supplement the actions described above. For example, in a case where a downward (i.e., toward the user) tilt causes a downward scrolling in a web page, a degree of the tilt (i.e., the angle $\theta_3$) may be measured, and a speed of the scrolling operation may be increased as the pointing object 108a is tilted more (i.e., as $\theta_3$ becomes more acute).

Although FIGS. 4A, 4B, and 5 are illustrated as using the sensors 402 and 404, it should be understood that other configurations may be used. For example, in some implementations, the optical components 116a may detect light from the substantially planar regions 106a and 106b using the techniques described above with respect to FIGS. 1-3. That is, the operations of the sensors 120 and 122 described above with respect to FIGS. 2 and 3 may be implemented to detect light from the substantially planar region 106a, and such operations may be duplicated by a second pair of sensors disposed above the sensors 120 and 122, so as to detect light from the substantially planar region 106b above, and substantially in parallel with, the substantially planar region 106a. Then, the techniques of FIGS. 1-3 may be used to determine x, y coordinates of the pointing object 108a in each of the substantially planar regions 106a and 106b, so that a relationship therebetween may be determined by the tracking logic 118a. In still other implementations, the sensors 120 and 122 of FIGS. 1-3 may be used to determine first x, y coordinates of the first part of the pointing object 108a in the substantially planar region 106a, while the sensor 404 is used to determine x, y coordinates of the second part of the pointing object 108a in the substantially planar region 106b.

In yet another implementation, the sensors 402 and 404 may be considered to represent two pixel arrays (e.g., rows) of a single two-dimensional sensor. Then, the first pixel values and second pixel values may be read out (e.g., 602a and 602b) from the first and second pixel arrays (e.g., rows).

Figure 7A:
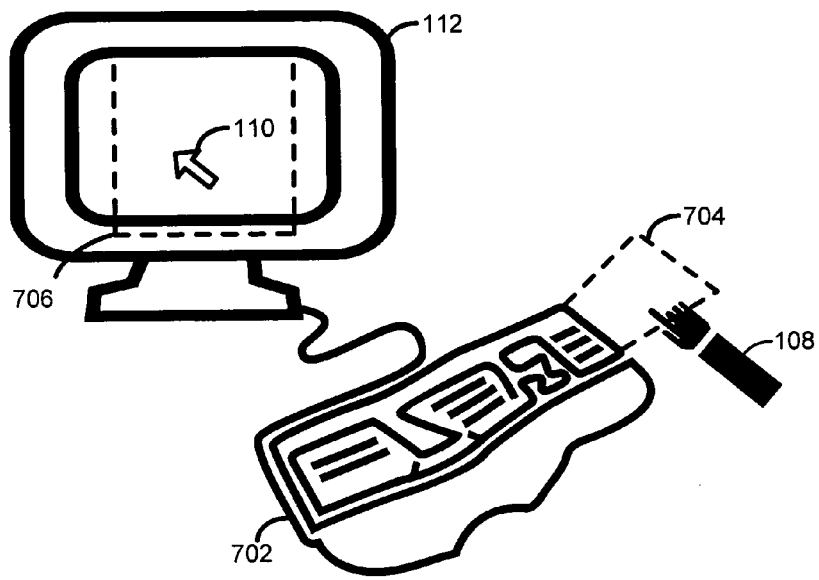
FIGS. 7A, 7B, 7C, and 7D illustrate example implementations of the systems of one or more of FIGS. 1-6.

FIGS. 7A, 7B, 7C, and 7D illustrate example implementations of systems of one or more of FIGS. 1-6. In FIG. 7A, a keyboard 702 is illustrated as an example of the user device 102 of FIG. 1. A substantially planar region 704 may be associated with the keyboard 702, as illustrated in FIG. 7A, and as should be understood from the above descriptions of FIGS. 1-6. Accordingly, control of the cursor 110 on the display 112 may be provided, and, moreover, it should be understood that a user may easily access the substantially planar region 704 during a typing operation or other use of the keyboard 702, with minimal hand movement being required.

Also, as should be understood from the discussion of FIG. 1, the substantially planar region 704 may be adjacent to other portions, and in other orientations, than that illustrated in FIG. 7A. For example, the substantially planar region 704 may be adjacent to a top, front surface of the keyboard 702, in a vertical direction and above the keyboard 702. As also described with respect to FIG. 1, tracking of the pointing object 108 within the substantially planar region 704 may be performed without dependence on any physical surface on which the keyboard 702 may rest, so that surface-independent movement of the pointing object 108 through a free or open space adjacent the keyboard 702 may be tracked for control of the cursor 110.

Finally in FIG. 7A, light from a substantially planar region 706 may be detected by an optical tracking system integrated with the display 112 itself. For example, a module(s) including the optical tracking system 104 or 104a may be disposed at a top, bottom, or side of the display 112, so as to project the substantially planar region 706 in front of a screen of the display 112. In this way, for example, the display 112 may effectively be turned into a touch-screen, so that a user may have the experience or feel of touching (or almost touching) a desired portion of the display 112, in order, for example, to direct the cursor 110 or perform a drawing function across an area of the display 112.

Figure 7B:
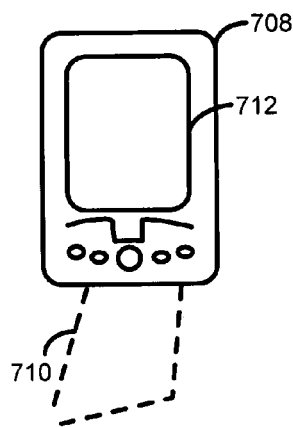

In the example of FIG. 7B, a personal digital assistant (PDA) 708 is illustrated, and may be used to provide optical tracking, where, for example, a substantially planar region 710 is detected at a bottom or side of the PDA 708, and the resulting tracking may be performed with respect either to an integrated display 712 of the PDA, and/or an external display. In this way, a user may more easily work with the PDA 708 (or any other wireless communications device), despite a relatively small size of the device.

Figure 7C:
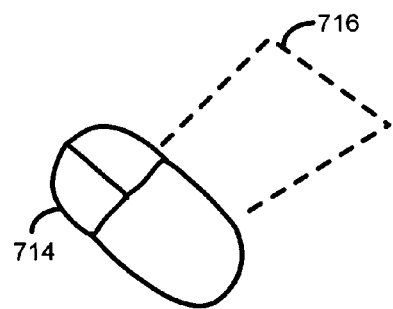

In the example of FIG. 7C, a mouse 714 is illustrated as detecting light from a substantially planar region 716. For example, the mouse 714 may be used to provide conventional cursor-tracking functionality, while light from the substantially planar region 716 is detected at a side of the mouse 714, in order to provide supplemental functionality, such as, for example, a drawing or scrolling function.

Figure 7D:
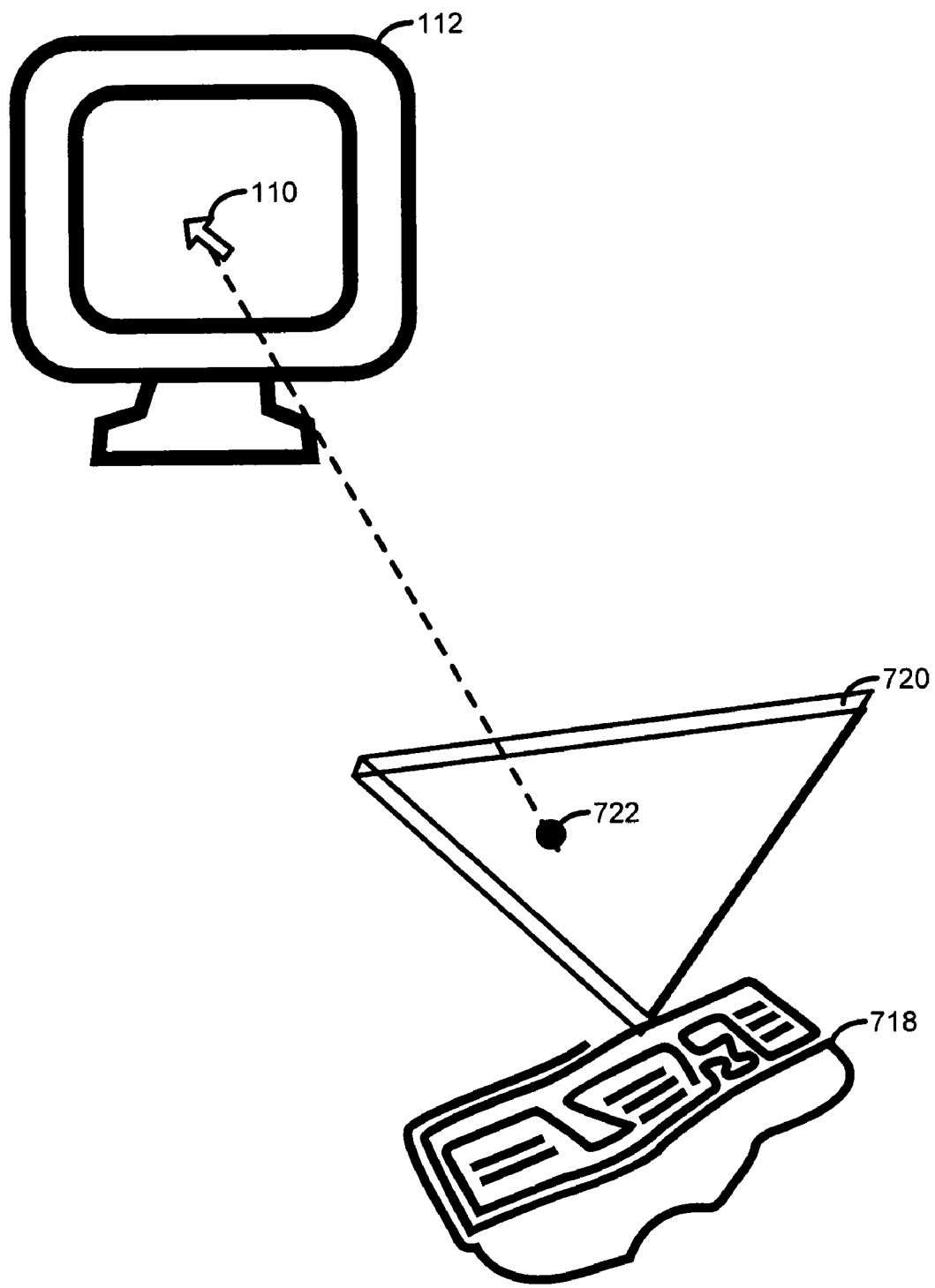

In the example of FIG. 7D, a keyboard 718 is illustrated as detecting light from a substantially planar region 720, and, in particular, detects light reflected at a point 722 corresponding to a pointing object (not shown in FIG. 7D; e.g., the pointing object 108). As shown, light from the substantially planar region 720 is detected from pointing object movement above the keyboard 718 and within a vertically-defined region over the keyboard 718. In this way, for example, a user holding the keyboard 718 may control the cursor 110 without reference to any physical surface on which the keyboard 718 may rest. Such an implementation may be used, for example, by a user operating the display 112 as a television display, e.g., in a non-traditional setting for the keyboard 718, such as a living room of the user.

Although FIGS. 7A-7D illustrate specific examples of the user device 102, it should be understood that many other examples exist. For example, the user device 102 of FIG. 1 also may generally represent other compact, portable computing devices, such as a cell phone, a tablet personal computer, and/or a portable gaming system. In the latter example, light from associated substantially planar region(s) may be used to allow various game functionalities to be implemented.

In still other example implementations, optical tracking system 104 may be implemented as a discrete module that may easily be inserted into, or integrated with, another component or device. For example, the optical tracking system 104 (or 104a) may be implemented in the context of a Personal Computer Memory Card International Association (PCMCIA) card, that may be inserted into a corresponding, standard slot of, for example, a laptop computer. In another implementation, such a module may be plugged into the keyboard 702 or other device using a Universal Serial Bus (USB) port or other connection technology.

Of course, any of the example implementations and techniques described above with respect to FIGS. 1-6 may be used in the examples of FIGS. 7A-7D, and in the other examples just mentioned. For example, in any one of the examples of FIGS. 7A-7D, dual substantially planar regions may be used along the lines of FIGS. 4A and 4B, in order to provide the tilt detection functions described with respect thereto. Also, other features described with respect to FIGS. 1-6 may be provided. For example, LEDs or other source lights may be included, as may be the various filters and/or beam-forming optics described above.

As described herein, optical tracking allows for various advantageous features, including, for example, direct finger cursor control, gesture detection capability, stylus inputs, a touch screen, and various other uses and applications. Described systems and methods provide good spatial resolution and accuracy, and responsive tracking speeds.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    receiving first pixel values from a first pixel array that correspond to a first part of a pointing object in a first substantially planar region;
    receiving second pixel values from a second pixel array that correspond to a second part of the pointing object in a second substantially planar region, the second substantially planar region being substantially parallel and non-intersecting to the first substantially planar region;
    determining a relationship between the first part of the pointing object and the second part of the pointing object, based on the first and second pixel values; and
    providing an action on a display, based on the relationship.

2. The method of claim 1 wherein receiving first pixel values from a first pixel array comprises:
    receiving the first pixel values from a first sensor and a second sensor that are disposed substantially along an axis that includes the first substantially planar region; and
    determining coordinates associated with a movement of the pointing object, based on the first pixel values.

3. The method of claim 1 wherein receiving first pixel values from a first pixel array comprises:
    determining apparent size information associated with the first part of the pointing object, relative to reference size information associated with the first part of the pointing object; and
    determining coordinates associated with a movement of the pointing object, based on the apparent size information and the reference size information.

4. The method of claim 3 wherein determining apparent size information associated with the first part of the pointing object comprises:
    determining the reference size information as a detected size from a time prior to the determining of the apparent size information.

5. The method of claim 3 wherein determining apparent size information associated with the first part of the pointing object comprises:
    determining the reference size information as a pre-determined measure of the pointing object.

6. The method of claim 3 wherein determining apparent size information associated with the first part of the pointing object comprises:
    determining, within the first pixel array, a start pixel and an end pixel of activated pixels that correspond to the first part of the pointing object within the first substantially planar region.

7. The method of claim 1 wherein receiving second pixel values from a second pixel array comprises:
    receiving the second pixel values from the second pixel array, the second pixel array including a row of pixels included within the second substantially planar region.

8. The method of claim 1 wherein determining a relationship between the first part of the pointing object and the second part of the pointing object comprises:
    determining a first coordinate of the first part of the pointing object within the first substantially planar region;

determining a second coordinate of the second part of the pointing object within the second substantially planar region; and determining the relationship based on the first coordinate and the second coordinate.

9. The method of claim 1 wherein determining a relationship between the first part of the pointing object and the second part of the pointing object comprises:

determining the relationship based on a distance between the first pixel array and the second pixel array.

10. The method of claim 1 wherein providing an action on a display comprises:

providing the action on the display based on a degree of tilt of the pointing object, as determined from the relationship.

11. The method of claim 1 wherein providing an action on a display comprises:

providing the action on the display based on a direction of tilt of the pointing object, as determined from the relationship.

12. The method of claim 1 wherein providing an action on the display comprises:

providing a cursor control action on the display, based on the relationship.

13. A system comprising:

optical components including
    a first pixel array included within a first substantially planar region and operable to output first pixel values corresponding to a first part of a pointing object within the first substantially planar region;
    a second pixel array included within a second substantially planar region and operable to output second pixel values corresponding to a second part of a pointing object within the second substantially planar region, the second substantially planar region being substantially parallel and non-intersecting to the first substantially planar region; and tracking logic operable to determine a relationship between the first part of the pointing object and the second part of the pointing object, based on the first and second pixel values, and further operable to provide an action on a display, based on the relationship.

14. The system of claim 13 wherein the tracking logic is able to determine the relationship as including a tilt of the pointing object relative to the first substantially planar region.

15. The system of claim 13 wherein the optical components comprise:

a first sensor that includes a first part of the first pixel array and is included within the first substantially planar region;

a second sensor that includes a second part of the first pixel array and is included within the first substantially planar region.

16. The system of claim 13 wherein the first pixel values are associated with an apparent size of the first part of the pointing object, and wherein the tracking logic is operable to determine a coordinate of the first part of the pointing object based on the apparent size relative to a reference size.

17. The system of claim 13 wherein the first pixel array is included in a first row of an image sensor, and the second pixel array is included in a second row of the image sensor that is substantially parallel to the first row.

18. The system of claim 13 wherein the first pixel array is included in a first image sensor, and the second pixel array is included in a second image sensor that is substantially parallel to the first sensor.

19. A device comprising:

optical components including a first pixel array associated with a first substantially planar region and a second pixel array associated with a second substantially planar region, the second substantially planar region being substantially parallel and non-intersecting to the first substantially planar region; and tracking logic that is operable to receive first pixel values from the first pixel array and determine movement of a pointing object within the first substantially planar region, based thereon, and further operable to receive the second pixel values from the second pixel array and determine a tilt of the pointing object relative to the first substantially planar region, based on the first pixel values and the second pixel values.

20. The device of claim 19 wherein the tracking logic is operable to provide an action on a display, based on the tilt.

* * * * *